(12) United States Patent
Sparschuh

(10) Patent No.: US 11,873,158 B2
(45) Date of Patent: Jan. 16, 2024

(54) GLASS ARTICLE LAYER, GLASS ARTICLE BUNDLE, AND METHOD FOR PRODUCING A GLASS ARTICLE LAYER

(71) Applicant: SCHOTT AG, Mainz (DE)

(72) Inventor: Georg Sparschuh, Vadodara Gujarat (IN)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/715,982

(22) Filed: Dec. 16, 2019

(65) Prior Publication Data

US 2020/0189839 A1 Jun. 18, 2020

(30) Foreign Application Priority Data

Dec. 14, 2018 (DE) ...................... 10 2018 221 781.5

(51) Int. Cl.
| | |
|---|---|
| *B65D 85/42* | (2006.01) |
| *B32B 17/10* | (2006.01) |
| *B65D 71/02* | (2006.01) |
| *B65D 85/20* | (2006.01) |

(52) U.S. Cl.
CPC ........ *B65D 85/42* (2013.01); *B32B 17/10009* (2013.01); *B32B 17/10559* (2013.01); *B65D 71/02* (2013.01); *B65D 85/20* (2013.01)

(58) Field of Classification Search
CPC ........ B65D 85/42; B65D 71/02; B65D 85/20; B32B 17/10009; B32B 17/10559
USPC ................. 206/334, 336, 585, 443
See application file for complete search history.

(56) References Cited

U.S. PATENT DOCUMENTS

| | | | | |
|---|---|---|---|---|
| 2,350,752 | A | * | 6/1944 | Graf ...................... H01M 4/765 |
| | | | | 429/140 |
| 3,143,266 | A | | 8/1964 | Imatake |
| 3,294,225 | A | | 12/1966 | Kenyon |
| 3,373,540 | A | | 3/1968 | Wisner |
| 3,611,656 | A | * | 10/1971 | Chidsey ................. B65D 71/50 |
| | | | | 206/145 |
| 3,802,987 | A | | 4/1974 | Noll |
| 4,137,821 | A | * | 2/1979 | Benedict ............... F42B 39/087 |
| | | | | 198/803.15 |
| 4,385,696 | A | * | 5/1983 | Benedict ............... F42B 39/087 |
| | | | | 206/150 |

(Continued)

FOREIGN PATENT DOCUMENTS

| | | |
|---|---|---|
| CN | 1122301 | 5/1996 |
| CN | 101905785 | 12/2010 |

(Continued)

OTHER PUBLICATIONS

ISO 6939.
English translation of DIN EN ISO 137, "Wool—Determination of fibre diameter", Sep. 2016, 19 pages.

*Primary Examiner* — Chun Hoi Cheung
(74) *Attorney, Agent, or Firm* — Ruggiero McAllister & McMahon LLC

(57) ABSTRACT

A glass article layer is provided that includes at least two cylindrical glass articles arranged side by side in an x-direction and extending in a z-direction. Spacers are arranged between the cylindrical glass articles. The spacers are provided at least at two spaced apart spacer positions in the z-direction longitudinally of the cylindrical glass article. The spacers are thread-like elements and at least one thread-like element is provided at each position.

27 Claims, 13 Drawing Sheets

(56) References Cited

U.S. PATENT DOCUMENTS

| | | | |
|---|---|---|---|
| 4,446,964 A | 5/1984 | Moran | |
| 4,693,167 A * | 9/1987 | Bagwell, Jr. | F42B 39/087 |
| | | | 139/390 |
| 4,907,326 A * | 3/1990 | Dietzel | B65G 35/04 |
| | | | 29/33 T |
| 5,294,222 A * | 3/1994 | Smith | B60P 7/08 |
| | | | 206/443 |
| 6,638,133 B1 | 10/2003 | Brancolino | |
| 6,915,619 B2 * | 7/2005 | Baldwin | B65B 9/02 |
| | | | 53/399 |
| 11,352,197 B2 | 6/2022 | Sparschuh | |
| 2008/0156681 A1 * | 7/2008 | Albrecht | B65D 71/066 |
| | | | 206/446 |
| 2012/0326442 A1 | 12/2012 | Crichton | |
| 2013/0240398 A1 | 9/2013 | Garner | |
| 2014/0196402 A1 | 7/2014 | Mader | |
| 2015/0267844 A1 | 9/2015 | Zantout | |
| 2016/0221736 A1 | 8/2016 | Hayashi | |
| 2017/0174403 A1 | 6/2017 | Feudner | |

FOREIGN PATENT DOCUMENTS

| | | |
|---|---|---|
| CN | 103796933 | 5/2014 |
| CN | 103813969 | 5/2014 |
| CN | 105501705 | 4/2016 |
| DE | 82301 | 11/1970 |
| DE | 2729966 | 1/1979 |
| DE | 224555 | 7/1985 |
| DE | 4225876 | 10/2001 |
| DE | 20121582 | 2/2003 |
| EP | 0132587 | 2/1985 |
| FR | 2675776 | 10/1992 |
| JP | S50161394 | 12/1975 |
| JP | H09295686 | 11/1997 |
| JP | H10114382 | 5/1998 |
| WO | 2015037361 | 3/2015 |

* cited by examiner

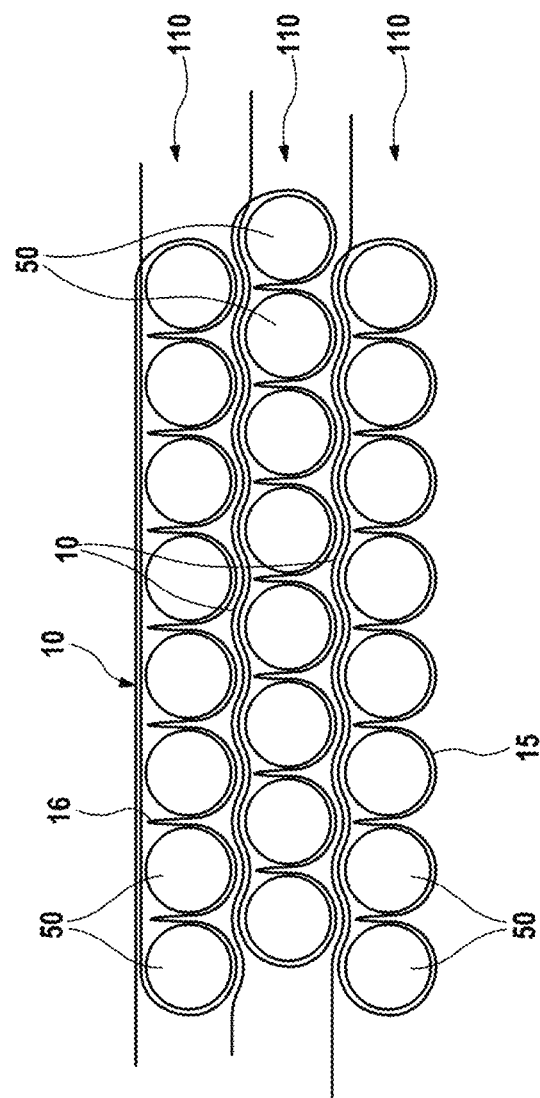

GLASS ARTICLE LAYER, GLASS ARTICLE BUNDLE, AND METHOD FOR PRODUCING A GLASS ARTICLE LAYER

CROSS REFERENCE TO RELATED APPLICATIONS

This application claims benefit under 35 USC 119 of German Application 10 2018 221 781.5 filed Dec. 14, 2018, the entire contents of which are incorporated herein by reference.

BACKGROUND

1. Field of the Invention

The invention relates to a glass article layer. The invention also relates to a glass article bundle and to a method for producing a glass article layer.

2. Description of Related Art

When packing glass articles, in particular glass tubes, glass-to-glass contact of the outer surfaces occurs during the fabrication process. Initially, the glass tubes are arranged to form glass tube layers and then to form a glass tube bundle, which is held together in a rectangular shape by shrink caps at the ends thereof. The arrangement is made with the closest packing possible. When the surfaces of the tubes inevitably touch each other, linear contact (a contact line) is resulting. At the contact points along the contact line, surface damage or scratches may be caused.

When being palletized, these bundles are grouped in layers and stacked on a pallet. As the bundles are urged together, the outer end glass tubes will touch each other, which also implies the risk of surface damage and scratches.

It has been found that tube to tube relative movements cannot be completely ruled out with the previous packing techniques, especially under unfavorable shipping conditions such as poor roads, high seas for sea freight, turbulence for air freight. As a result, scratches are caused by frictional movement, which in the simplest case will cause cosmetic defects, but often make the tube unusable and will even lead to breakage of the tube in extreme cases.

In the first phase of glass-to-glass friction, small microcracks are created which significantly reduce the strength of the tube. If, as the friction continues, small glass particles are moreover released, unwanted sharp contact points are produced which will just come into contact with the already weakened surfaces of the tube and lead to breakage outcomes.

Another drawback is that freshly fabricated glass surfaces tend to stick together due to the chemically active surface (reaction with atmospheric moisture). Although this effect is reduced by the applied coating of the glasses, it cannot be completely avoided in practice. The sticking of the tubes may lead to microcracks in the surface during unpacking, which are critical insofar as they have a great stability-reducing effect.

Between the individual glass article layers, cardboard liners are arranged, for example, which may however cause marks on the glass tubes. Moreover, the cardboard usually does not separate the glass tubes within a glass tube layer. Once the assembly of layers is complete, the entire pallet is furthermore protected and held together by means of a shrink film. The weight of a pallet is around 800 kg on average.

During storage and shipping until delivery to the customer, the pallet is raised and lowered at least six to seven times. During this process, the tube surfaces of the tubes move against and relative to each other. During shipping to the customer, the movement of the transport means implies a high probability that the glass tube surfaces will frictionally engage on each other. The probability of surface damage of the glass tubes is very high in this case.

When the pallet is unstacked, the tube bundles are disassembled in the reverse order as in the packing, down to the individual glass tube, which is then fed into the processing machine, e.g. a vial forming machine, etc., either manually or by a robot. Here, again, the tube surfaces will inevitably come into contact thereby causing surface damage and scratches.

In order to minimize scratches on the glass tubes on their way to the customer, the glass tubes are often surface coated. However, the layer of several nanometers in thickness only provides protection as long as this layer is not scraped off by the mutual contact. Often, surface damage and scratches are resulting despite the coating. A surface coating is not able to prevent scratches, but at best minimizes them.

Surface defects cause several problems.

Scratches on the surface of the glass tubes caused by mutual contact during packing, in the package, on the pallet, during shipping, and when unstacking the pallet at the customer's site lead to a reduction of the visual quality or even non-compliance with the required specification.

Due to surface defects, the strength of the entire glass tube is significantly reduced, which then also applies to the pharmaceutical containers produced therefrom.

Surface damage may lead to breakage in the pallet and thus to a contamination of adjacent glass tubes or tube bundles. Scratches may entail misdetections in customer's optical online inspection equipment. Such scratches are even detected in the bottling systems and inspection systems of pharmacists, leading to corresponding complaints of the customers.

From DE 27 29 966, a package of tubes made of brittle material such as glass or glass ceramics is known, in which the tubes are provided in close packing and in a rectangular assembly and are wrapped in a shrink film at least at the ends and end faces thereof so as to be fixed in their position. In the package, the tubes lie on top of each other and may scratch.

EP 0 132 587 A1 proposes to place a film or film strips on each layer of tubes in order to prevent the glass tube bundle from rolling apart. Instead of a film, the individual tubes can also be provided with an anti-slip coating, for example made of spray-on silicone, or with rings of polyethylene rubber or textile material fitted thereto.

DE 20 121 582 U1 discloses protective caps which are attached to both ends of a glass tube in order to prevent the tubes from coming into contact and causing scratches on the surface during packing and shipping. The protective caps serve both as spacers and for sealing the open tubes.

DE 42 25 876 C2 discloses a packing receptacle for rod-shaped items such as glass tubes and glass rods. A respective pair of strips made of a film-like material enclose juxtaposed glass tubes, thereby forming a multi-member belt that has receptacle members for engaging a respective glass tube. The adjacent receptacle members are interlinked through a two-layered intermediate web. In the area of the intermediate webs, the two strips are bonded to one another by means of an adhesive and/or an embossing seam. Each glass tube layer has such a belt spaced apart from the ends of the glass tubes. Stacked glass tube layers contact each other in the region of the belts.

DD 224 555 A1 describes a method for packing glass tubes using shrink film, in which a respective prefabricated rectangular film sleeve made of plastic material is fitted onto each of the two ends of a glass tube package and these film sleeves are shrunk using appropriate shrinking units. Before fitting the prefabricated film sleeves, the glass tube ends can be completely or partially enclosed by further stabilizing means.

DD 82 301 discloses a package for shock-sensitive, tubular glass articles. Equally spaced trapezoidal flaps are punched into a pallet made of corrugated cardboard material in a manner so as to be arranged mutually offset in the opposite folding direction and folded up relative to the surface of the pallet to one side. The folded-up flaps form a lateral boundary for the articles to be packed and prevent lateral contact.

JP H09-295686 A discloses a spacer for a stacked assembly of glass tubes. The spacer has semicircular recesses which are separated by ribs and each one is adapted to accommodate one glass tube. In contrast to the prior art described in JP H09-295686 A, the glass tubes can be arranged with an offset by means of the spacer so that more glass tubes can be accommodated in the same total volume.

The spacer of JP H09-295686 A occupies much space between the tubes, so that consequently only a small number of glass tubes can be accommodated compared to the total volume of the stacked assembly. The same applies to some of the spacers known from WO 2015/037361 A1. Moreover, this type of spacer is complex to manufacture.

However, WO 2015/037361 A1 also discloses another option for a spacer. Accordingly, a band-shaped spacer made of paper or cardboard is placed between the glass tubes. The spacer then assumes a waveform. In this way, the spacing between the glass tubes is reduced, so that more glass tubes can be accommodated in the same volume.

An object of the invention is to provide a glass article layer and a glass article bundle, in which surface damage and scratches on glass articles can be easily avoided from packing until delivery to the customer. Another object is to provide a method for producing such glass article layers.

This object is achieved with a glass article layer as disclosed herein. The glass article layer comprises at least two glass articles arranged side by side in an x-direction and extending in a z-direction, and spacers are disposed between the glass articles, which are provided at least at two spaced-apart spacer positions in the z-direction longitudinally of the glass articles, wherein the spacers are thread-like elements, and wherein at least one thread-like element is provided at each spacer position.

Preferably, at least one common thread-like element is arranged at each spacer position between all the glass articles.

The term glass also refers to thermally treated glass, in particular glass ceramics.

The x- and z-directions mentioned refer to an orthogonal xyz-coordinate system which is shown in the figures for the sake of better understanding.

"Thread-like element" is preferably understood to mean a thin item twisted from fibers or from strips of material. In the context of the invention, the term "thread-like element" also encompasses strings, lines and cords. Preferably, the thread-like element is a round cord, an oval cord, a braided cord or a string from twisted film strips, for example. The thread-like element may be made of an extruded material.

The material of the spacers is preferably chosen so as to not cause any contamination of the glass surface by deposits or abrasion. At the same time, the material and shape of the spacers should furthermore be chosen so that manufacturing is as cost-effective as possible.

Without the spacers, surface defects and scratches will be caused on the outer surfaces of the glass articles along the contact line of the glass articles that are arranged side by side in the z-direction. Such surface defects and scratches are avoided by the spacers.

"Between the glass articles" means that the spacers are arranged at least at the contact line of the glass article surfaces of adjacent glass articles.

The thread-like elements keep the glass articles of a glass article layer spaced apart. The thread tension has to be chosen such that the glass article layer, which may comprise up to 30 glass articles, is stabilized to such an extent that the glass article layer can be handled and stacked together with further glass article layers to form a glass article bundle.

A glass article bundle may include up to 30 glass article layers. The thread-like elements do not need to fulfil a holding or stabilizing function for the glass article bundle, since the necessary stability of the glass article bundle is preferably achieved by the cover sheaths provided at the ends of the glass article bundle, e.g. by applied caps that may be made of shrink film, for example.

"Wrapped around" is preferably understood to mean looped around the outer circumference of the glass article so that the thread-like element preferably moreover at least partially engages on the outer circumference of the glass article. The expression "at least partially wrapped around" is preferably understood to mean that the thread contacts the glass article at least along a section of the outer circumference.

Preferably, the thread-like element contacts 40% to 80% of the outer circumference of each glass article. Particularly preferably, the thread-like element contacts at least half the outer circumference of each glass article.

The use of thread-like elements has the advantage that it is possible to dispense with prefabricated spacers which have to be arranged between the glass articles and/or glass article layers. A return transport of the prefabricated spacers from the customer to the manufacturer or disposal of the prefabricated spacers after unpacking of the glass article bundles is avoided.

Although the thread-like elements have to be disposed of or recycled as well, the thread volume to be disposed of is very low.

It has been found that breakage of or damage to the glass articles can be reliably ruled out despite the very small contact areas of the threads.

The load built-up over the respective glass article layer by further glass article layers is diverted exclusively at the support points of the thread-like elements.

Another advantage of the thread-like elements is that the producing of glass article layers can be automated and that the unpacking of the glass article layers is simplified.

Preferably, two thread sections are arranged at each spacer position between each pair of adjacent glass articles. The two thread sections are sections of a single thread-like element.

Preferably, the thread-like element is at least partially wrapped around at least one glass article, in particular around every glass article of the glass article layer.

According to a first embodiment, a single thread-like element is provided at each spacer position.

The two thread sections are preferably sections of the single thread-like element, in particular loop sections of the single thread-like element.

The single thread-like element is arranged in such a way at each spacer position that it is wrapped around every glass article along an equal outer circumferential area and forms wraps there, and such that a loop is provided between each pair of adjacent glass articles.

Thus, a series of U-shaped wraps alternating with loops is provided at each spacer position.

In a glass article layer lying in an xz-plane, the thread-like element at the respective spacer position is wrapped around all the glass articles on the upper side thereof, thus forming only upper wraps, or only on the lower side thereof, thus forming only lower wraps, and in both cases there is a loop provided between each pair of adjacent glass articles of the glass article layer.

This embodiment has the advantage that the adjacent glass articles are separated by two thread sections although only one thread-like element is used at each of the spacer positions. There are thus two support points provided between the adjacent glass articles at the spacer positions. Since the occurring forces are distributed to two thread sections and thus to two support points in each case, the thread material may be made thinner or more elastic, for example, as if only a single thread section was used.

Preferably, the loop extends in the y-direction beyond a line L that connects the centers of the glass articles.

Preferably, the loop has a first upreaching loop section and a second upreaching loop section which are interconnected by a third loop section.

Preferably, the first and the second loop sections are arranged offset to one another in the z-direction.

Preferably, the thread-like element has a first end and a second end, wherein each of the ends is connected the respective last wrap through a connecting section.

The length of the connecting sections can be chosen such that the ends of the thread-like elements protrude from the glass article in the x-direction.

According to a further embodiment it is contemplated that the connecting sections rest on the upper side of the glass article layer and extend over the glass article layer in the x-direction. Preferably, the connecting sections extend over the entire width of the glass article layer, which has the advantage that the ends can protrude from the glass article layer. This embodiment has the advantage that the glass articles are stabilized in a glass article bundle in the x-direction.

According to a second embodiment, a first thread-like element and a second thread-like element are provided at each spacer position.

Preferably, the two thread sections between two adjacent glass articles at each spacer position are sections of the first thread-like element and of the second thread-like element.

Preferably, each of the two thread-like elements is wrapped around all the glass articles alternately along the upper side and the lower side thereof.

Thus, a series of U-shaped wraps is formed, with alternating upper and lower wraps for each thread-like element. In this case, the upper and lower wraps of one thread-like element are arranged offset to the upper and lower wraps of the second thread-like element.

Preferably, the glass articles are wrapped by the first thread-like element along the upper side thereof, thereby defining upper wraps, and by the second thread-like element along the lower side thereof, thereby defining lower wraps, and alternately thereto are wrapped by the first thread-like element along the lower side thereof, thereby defining lower wraps, and by the second thread-like element along the upper sides thereof, thereby defining upper wraps.

Each thread-like element preferably has a first end and a second end, which may preferably be placed on the glass article layer. According to a preferred embodiment, the first ends are connected to one another and the second ends are connected to one another.

Preferably, the ends are connected to one another by thermal fusing, gluing or by mechanical connecting means. Mechanical connecting means may include clips or knots.

Preferably, the thread-like element has a thread thickness S, with 0.25 mm≤S≤2.5 mm, in particular 1.5 mm≤S≤2.5 mm, preferably 0.25 mm≤S≤1.25 mm, most preferably 0.5 mm≤S≤1 mm. The thread-like element may in particular have a thread thickness S of at least 0.5 mm, or a thread thickness S of at least 4.0 mm.

For example, the thread-like element may have a thread thickness between not less than 0.25 mm and at least 2.5 mm, in particular from at least 1.5 mm to at most 2.5 mm, preferably from at least 0.25 mm to at most 1.25 mm, preferably at most 1.0 mm.

However, it is also possible for the thread thickness of the thread-like element to be 0.1 mm, or 0.2 mm, or 0.3 mm, or 0.4 mm, or 0.5 mm, or 0.6 mm, or 0.7 mm, or 0.8 mm, or 0.9 mm, or 1.05 mm, or 1.1 mm, or 1.5 mm.

The thread thickness of the thread-like element may be determined, for example, in accordance with or following the projection microscope technique as described in DIN EN ISO 137, for example.

The thread-like element is preferably made of a plastic material. Preference is given to elastic polymer materials which enable the spacers to cushion vibrations of the glass articles occurring during shipping of glass article layers and glass articles bundles. The risk of breakage of the glass articles is thereby further reduced. The plastic material preferably comprises polypropylene (PP), polyethylene (PE), preferably high-density polyethylene (HDPE), polyethylene wax, polyamide (PA), styrene-acrylonitrile copolymer (SAN), polyester, polyethylene terephthalate (PET), polybutylene terephthalate (PBT), polyurethane (PU), acrylonitrile-butadiene-styrene copolymer (ABS), polyether ether ketone (PEEK), and/or polycarbonate (PC), or the plastic material consists of the one or more polymer(s) mentioned.

In particular, the thread-like element may comprise polypropylene (PP), polyethylene, in particular high-density polyethylene (HDPE), polyethylene wax, polyamide (PA), styrene-acrylonitrile copolymer (SAN), polyester, polyethylene terephthalate (PET), polybutylene terephthalate (PBT), polyurethane (PU), acrylonitrile-butadiene-styrene copolymer (ABS), polyether ether ketone (PEEK), and/or polycarbonate (PC), or the thread-like element may be made of polypropylene (PP), polyethylene, in particular high-density polyethylene (HDPE), polyethylene wax, polyamide (PA), styrene-acrylonitrile copolymer (SAN), polyester, polyethylene terephthalate (PET), polybutylene terephthalate (PBT), polyurethane (PU), acrylonitrile-butadiene-styrene copolymer (ABS), polyether ether ketone (PEEK), and/or polycarbonate (PC).

Preferably, the glass articles are glass tubes and/or glass rods.

The glass articles in the form of glass tubes and/or glass rods may be arranged in a glass article layer. In contrast to glass tubes, glass rods are made of solid material.

Preferably, the glass articles are cylindrical.

The spacer positions are preferably arranged at intervals $A_1$, $A_2$ with values between 20 cm and 80 cm, in particular between 40 cm and 60 cm. The length of the glass articles is preferably from 1 to 4 m, in particular from 1 m to 2 m, so that preferably 4 to 10 spacer positions are provided and accordingly a corresponding number of thread-like elements is needed. The diameter of the glass articles is preferably in a range from 5 mm to 40 mm.

The spacer positions may in particular range between at least 20 cm and at most 90 cm.

Where reference is made to the diameter of a glass article such as a glass tube in the context of the present disclosure, this refers to the outer diameter of the glass article. The outer diameter may be between 6 mm and 50 mm, depending on the addressed end product.

By way of example, the outer diameter may be 6.85 mm, 8.15 mm, 10.85 mm, 14.45 mm, 17.05 mm, or 22.05 mm, in particular for a glass tube intended for a syringe body as the addressed final product, or may be 8.65 mm, 10.85 mm, 10.95 mm, 11.60 mm, 14.00 mm, 14.45 mm or 18.25 mm, in particular for so-called carpule tube, or may range between 6.8 mm and 8.9 mm, or between 9.0 mm and 14.9 mm, or between 15.0 mm and 17.9 mm, or between 18.0 mm and 19.9 mm, or between 20.0 mm and 24.9 mm, or between 25.0 and 30.9 mm, or between 31.0 mm and 34.9 mm, or between 35.0 mm and 42.9 mm, or between 43.0 mm and 50.0 mm, in particular for glass tube intended for vials as the addressed end products, or between 9.0 mm and 14.9 mm, or between 15.0 and 17.9 mm, or between 18.0 mm and 19.9 mm, or between 20.0 mm and 24.9 mm, in particular for glass tube intended for ampoules as the addressed end products.

In the context of the present disclosure, outer diameter is understood to be the maximum distance of two points on the outer surface of the glass article, for example of two points on the outer surface of a glass tube, in a cross-sectional view.

A glass article may in particular be provided with a round cross section. Here, a glass article is referred to as round within the scope of measurement accuracy, if its roundness error is not greater than a certain value. The roundness error here is a measure of the deviation of the glass article's cross sectional shape from the ideal shape of a circle, in particular in a direction perpendicular to the longitudinal extension of the glass article. The perimeter of each cross section of the test object, i.e. the glass article to be tested, has to lie between two concentric circles that are spaced by a distance t from each other and lie in the same plane. A glass article is therefore referred to as round if its roundness error has a value less than or equal to t. The roundness error results arithmetically from half the maximum difference of outer diameters in a measuring plane. In practice, the term ovality is often used, which is the difference between the maximum and minimum outer diameters in a measuring plane, i.e. the maximum difference of outer diameters. The ovality value is therefore twice the roundness error value.

The glass article bundle preferably comprises 5 to 30 glass article layers.

The thread-like elements preferably also provide the spacers between the glass articles of adjacent glass article layers.

Glass articles such as, for example, glass tubes have a fabrication-related curvature that may vary from manufacturer to manufacturer. Each manufacturer specifies a maximum value of the curvature for his products in his technical delivery conditions. The curvature is a product-specific parameter that is known for the respective product. For the glass tube lengths mentioned, the curvature is typically in the range from 0.5 mm to 1.5 mm. Taking into account this known parameter, the intervals and the thread thickness S should be chosen so that the glass articles will not contact each other, despite an existing curvature, when arranged side by side or when stacked on top of each other.

It is advantageous to take into account a safety margin in addition to the curvature.

The safety margin is intended to ensure that the cylindrical glass articles will not touch even if vibrations of the cylindrical glass articles should occur during shipping. The vibration behavior of the cylindrical glass articles can be determined by vibration tests on the respective glass articles, for example, so that these findings can be considered when choosing the thread thickness S and the intervals A.

Generally, the greater the interval A is chosen, the greater the thread thickness S should be chosen.

An excessive thread thickness S, i.e. a thread thickness $S>2.5$ mm, will reduce the volume which is available for the glass articles of a glass article bundle within a glass article layer or a glass article bundle that comprises a multitude of glass articles.

The glass article bundle according to the invention comprises at least two glass article layers arranged on top of each other in the y-direction, and the glass article layers are arranged in such a way that the glass articles are arranged in close packing.

The glass article layers are arranged on top of each other and offset relative to each other. This arrangement is not only space saving, but also gives the glass article bundle improved stability.

The glass article bundle preferably comprises a cover sheath at least at the ends thereof. The ends of the glass article bundle coincide with the ends of the glass articles. In the case of glass tubes, the openings are preferably also covered by the cover sheath so that the interior of the glass tubes is not contaminated, for example during shipping. This cover sheath may for example be made of a shrink film.

The object is also achieved with a packing method.

According to a first embodiment, the method for producing a glass article layer that comprises at least two glass articles arranged side by side in an x-direction and extending in a z-direction comprises the following steps in the following order:
(a) providing at least two glass articles;
(b) continuously feeding the glass articles and separating the glass articles in a separation station;
(c) continuously feeding one respective thread-like element to the separated glass article at each of at least two predetermined spacer positions;
(d) wrapping the thread-like elements around the separated glass article at the predetermined spacer positions while forming loops between the individual glass articles;
(e) severing the thread-like elements once they have been wrapped around the last glass article of a glass article layer;
(f) processing the ends of the thread-like elements;
(g) removing the glass article layer.

According to a further embodiment, the method for producing a glass article layer that comprises at least two glass articles that are arranged side by side in an x-direction and extending in a z-direction comprises the following steps:
(a) providing at least two glass articles;
(b) continuously feeding the glass articles and separating the glass articles in a separation station;

(c) continuously feeding a first thread-like element and a second thread-like element to the separated glass article at each of at least two predetermined spacer positions;
(d) alternately wrapping the respective first and second thread-like elements around the glass articles at the spacer positions;
(e) severing the thread-like elements once they have been wrapped around the last glass article of a glass article layer;
(f) processing the ends of the thread-like elements; and
(g) removing the glass article layer.

Both methods are preferably carried out in such a way that at least two glass article layers, in particular a plurality of glass article layers, are successively produced and packed continuously.

It is also possible to perform the methods without method steps (e) and (f). In this case, the glass article layers remain interlinked and form a layer ribbon of glass article layers. In order to produce a glass article bundle, the glass article layers need not be placed on top of each other individually, but may for example be disposed continuously in a container. For this purpose, the layer ribbon is folded alternately in the container, so that the glass article layers come to lie on top of each other.

The present disclosure therefore also relates to a glass article bundle comprising at least two glass article layers, in particular glass article layers according to embodiments of the present application and/or glass article layers that are produced or can be produced in a packing method according to embodiments of the present specification.

Exemplary embodiments of the invention will now be explained with reference to the drawings, wherein:

FIG. 5b is an elevational view showing the end faces of a glass article bundle comprising glass article layers as in FIG. 5a;

Figure 1:
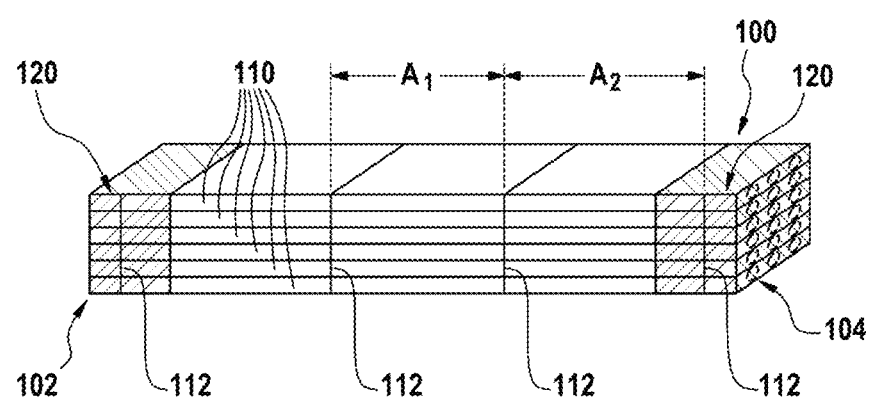
FIG. 1 is a perspective view of a glass article bundle comprising a plurality of glass article layers.
Figure 1:
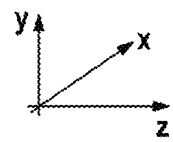

FIG. 1 is a schematic perspective view of a glass article bundle 100 which comprises six glass article layers 110. The glass article layers 110 lie in an x-z plane, and the glass articles 50 extend in the z-direction while being arranged side by side in the x-direction. The glass article layers 110 are stacked one above another in the y-direction.

Each glass article layer 110 has four spacer positions 112 arranged at an interval A from each other. In the embodiment shown here, two different intervals $A_1$ and $A_2$ are provided.

At each end 102, 104 of the glass article bundle 100, a cover sheath 120 is provided, e.g. made of a shrink film, which extends over an end portion of the glass article layer 110 and hence over end portions of the glass articles 50 and covers the end faces of the glass article bundle 100. Since the glass articles are glass tubes in the embodiment shown here, the tube openings are covered by the cover sheath 120, so that the interiors of the glass tubes are protected from contamination.

Figure 2:
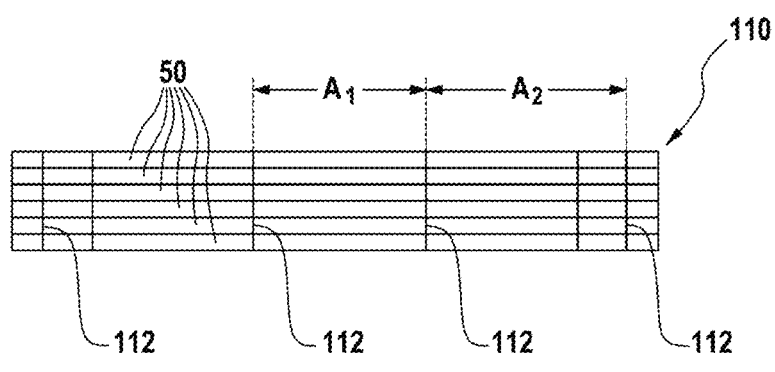
FIG. 2 is a plan view of a glass article layer.
Figure 2:
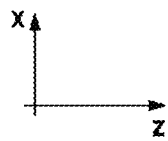

FIG. 2 shows a plan view of a glass article layer 110 which comprises six glass articles 50.

Figure 3:
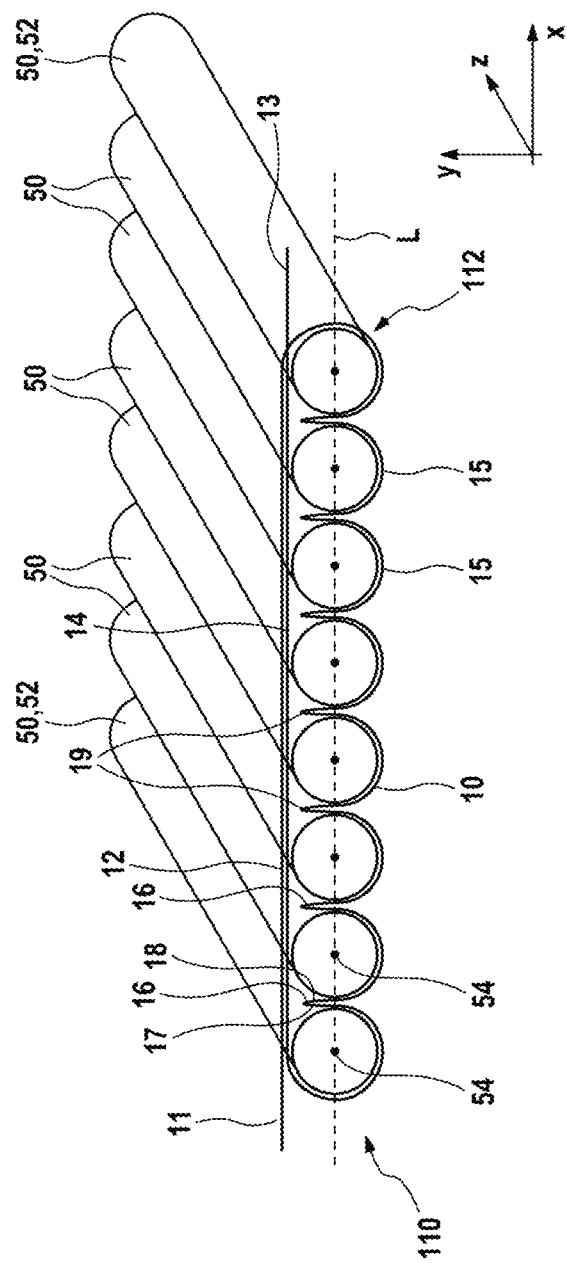
FIG. 3 is a perspective view of a glass article layer according to a first embodiment.

FIG. 3 shows a glass article layer 110 according to a first embodiment. The glass article layer 110 comprises eight cylindrical glass articles 50 arranged side by side in the x-direction, with the centers 54 of the glass articles arranged along a line L which extends parallel to the x-axis. At a spacer position 112 shown by way of example, a thread-like element or thread 10 is provided as the spacer, which is wrapped around all the glass articles 50 on the lower side thereof. These lower wraps 15 are in contact with the outer circumferential surface of the glass article 50 and extend over half the circumference of the outer circumferential area of the glass article 50. The two outer end glass articles 52 at the right and left ends are wrapped by the thread-like element 10 to about 75%.

The thread 10 has a first end 11 and a second end 13. These ends 11, 13 are connected to the wraps 15 of the two glass articles 52 through first and second connecting sections 12 and 14. The connecting sections 12 and 14 rest on the upper side of the glass article layer 110. In this embodiment, the ends 11 and 13 protrude outwards from the glass article layer 110 in the x-direction or may hang down outside, which makes it easier to grasp the threads 10 when unpacking the glass articles 50.

Between the glass articles 50, loops 16 are provided extending upwards from the wraps 15 in the y-direction beyond the line L. Each loop 16 has a first and a second loop section 17, 18 protruding upwards. The two loop sections 17 and 18 are interconnected by a third loop section 19. In the art of knots, such a loop 16 is referred to as a bight, the loop sections 17, 18 defining the legs of the bight.

Figure 4:
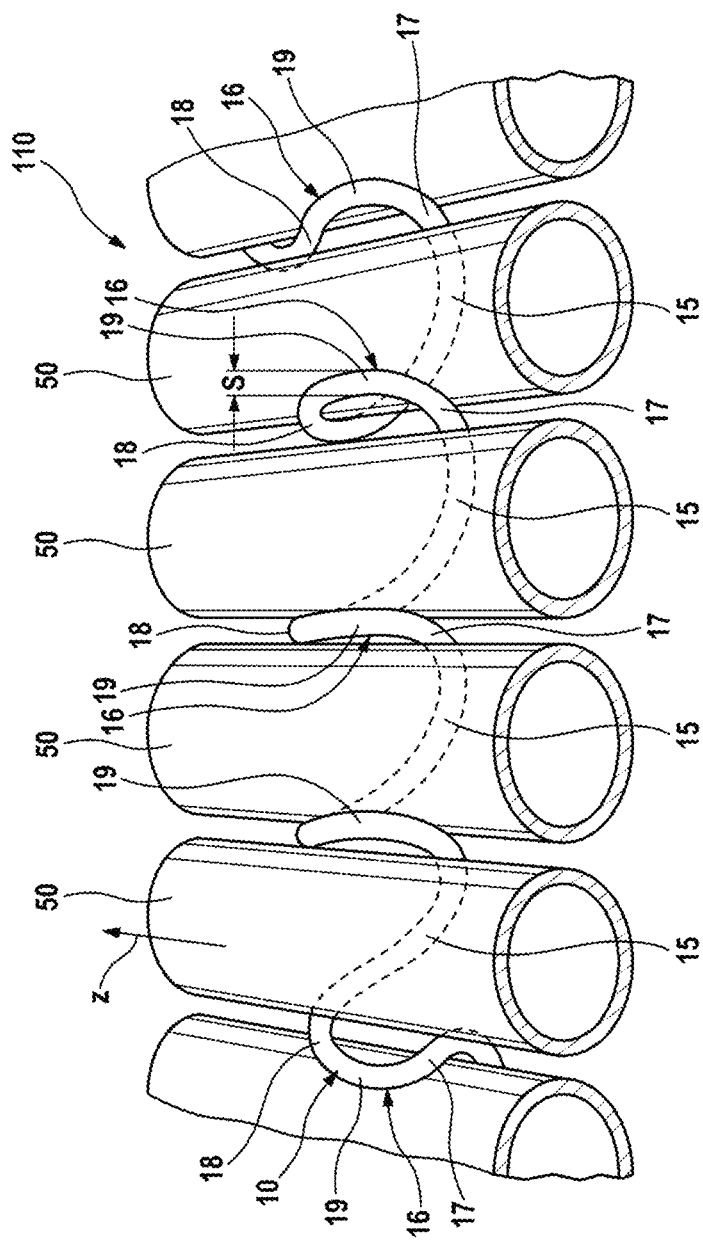
FIG. 4 is a top view of an enlarged detail of the glass article layer shown in FIG. 3.

FIG. 4 shows a top view of the glass article layer 110 shown in FIG. 3. The loops 16 are arranged such that the first and second loop sections 17, 18 are disposed side by side in the z-direction. Loop section 19 lies in a free space between the glass articles 50 and does not participate in the mutual support of the glass article 50. This arrangement has the advantage that two loop sections 17, 18 are provided between the glass articles 50 for mutual support in each case, so that the spacing between of the adjacent glass articles 50 is determined merely by the thread thickness S.

Figure 5A:
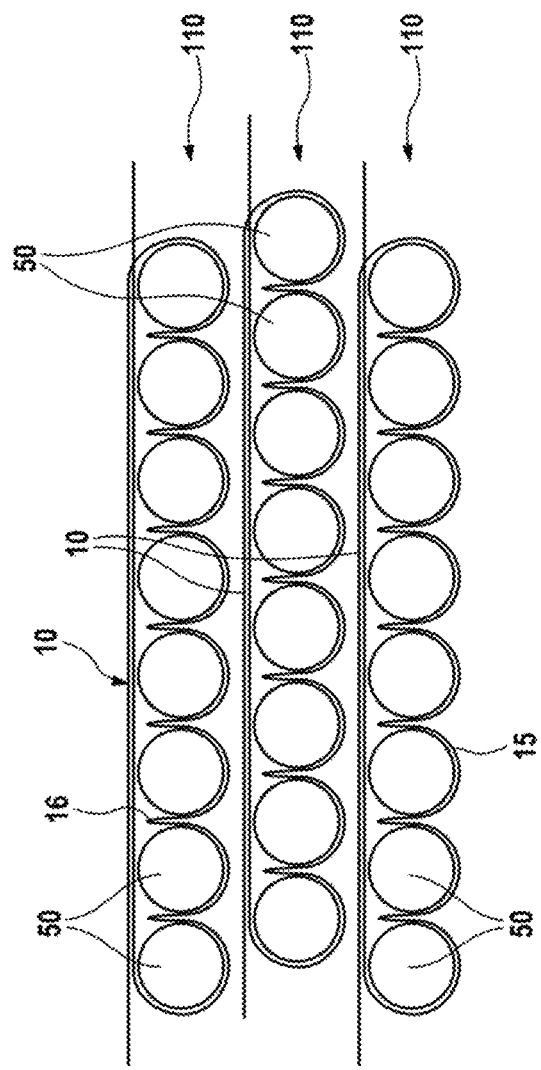
FIG. 5a is an elevational view showing the end faces of three glass article layers.

FIG. 5a is an elevational view showing the end faces of three layers 110 of glass articles arranged one above the other but not yet resting on top of each other, for explaining the staggered arrangement of the glass articles 50. The glass article layers 110 are shown offset one above the other in such a way that the glass articles 50 will be superposed in close packing when the glass article layers 110 are placed on top of each other to form a bundle 100, as can be seen in FIG. 5b.

Figure 6:
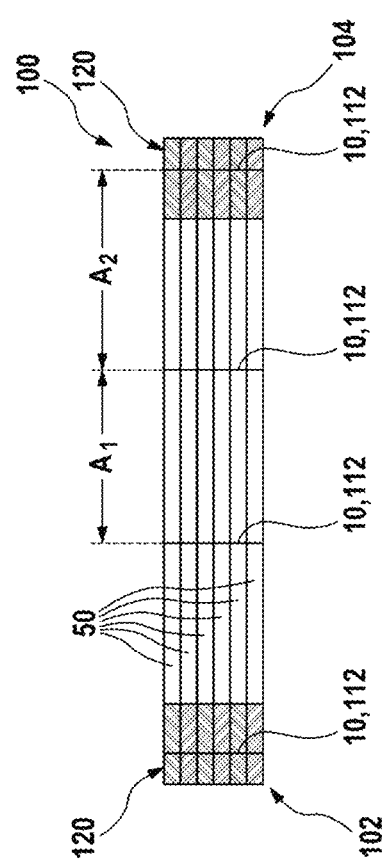
FIG. 6 is a plan view of a glass article bundle.

FIG. 6 shows a plan view of the glass article bundle 100 of FIG. 5b. The glass article bundle 100 has four spacer positions 112 at each of which a thread 10 is provided. The intervals $A_1$ and $A_2$ between the spacer positions 112 are 40 cm and 50 cm, for example, in the case of a glass article length of 2 m by way of example. The two ends 102, 104 of the glass article bundle 100 are enveloped by a cover sheath 120, e.g. made of a shrink film.

Figure 7:
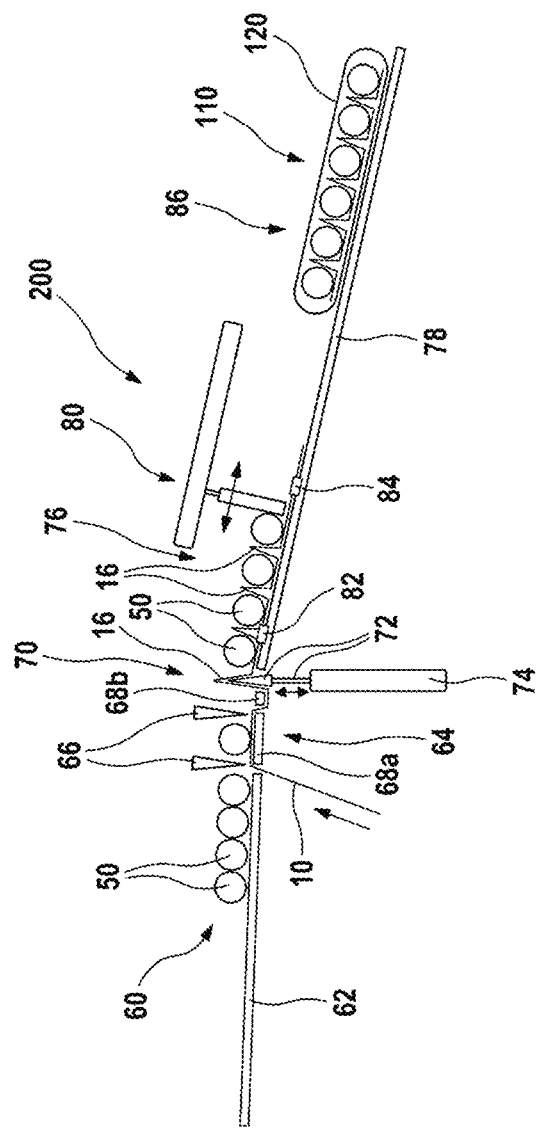
FIG. 7 is a schematic side view of a packing apparatus for explaining the method for producing glass article layers according to FIGS. 1 through 6.

FIG. 7 shows a side view of a first packing apparatus 200 which is used to produce glass article layers 110 according to FIGS. 1 through 6 with single threads 10 as the spacers. The glass articles 50 are supplied in a feed station 60 which comprises a first inclined plane 62, and are separated at the lower end of the first inclined plane 62. In the separation station 64 located there, two separating tools 66 are provided at a distance from each other, which are introduced from above and between the incoming glass articles 50 to separate them from each other. At the intended spacer positions 112, threads 10 are fed from below by a respective pair of thread deflection elements 68a, b, so that the separated glass article 50 located between the separating tools 66 initially rests on the threads 10.

Downstream of separation station 64, a loop station 70 is provided in which loops 16 are produced between each pair of adjacent glass articles by loop formers 72 which are likewise arranged at all spacer positions 112 along the glass articles 50.

The loop formers 72 are moved up and down by so-called push cylinders 74, so that during the upward movement the respective thread 10 is grasped and a loop 16 is formed, from which the loop former 72 subsequently retracts by a downward movement. The loops 16 are shown only schematically.

The glass articles 50 with the loops 16 are collected on a second inclined plane 78 of a layer forming station 76, where a thread brake 82 is provided which prevents the loops 16 from slipping.

The first glass article 50 of a glass article layer 110 is stopped by a stopper 80 that moves along until a complete glass article layer 110 has been produced. The inclined plane 78 causes the glass articles 50 to slide together until the arrangement shown in FIG. 4 is achieved. A thread cutter 84 is used to sever the threads 10 of the completed glass article layer 110. In a subsequent enveloping station 86, the two ends of the glass article layer 110 are wrapped with a cover sheath 120 in order to stabilize the glass article layer 110.

In a further step, not shown, the so produced glass article layers 110 are stacked on top of each other to form a glass article bundle 100 (see FIG. 5b), are once again wrapped with a cover sheath 120 at the ends 102, 104 thereof and are then removed by a transport means.

At the customer's site, the glass articles 50 of the glass article bundles 100 are separated, for which purpose the cover sheaths 120 at the ends of the glass article bundle 100 are removed first, then the cover sheaths 120 at the ends of the glass article layers 110 are removed, and finally the threads 10 between the glass articles 50 are removed. The threads can be easily removed by pulling them out from the glass article layers 110.

Figure 8:
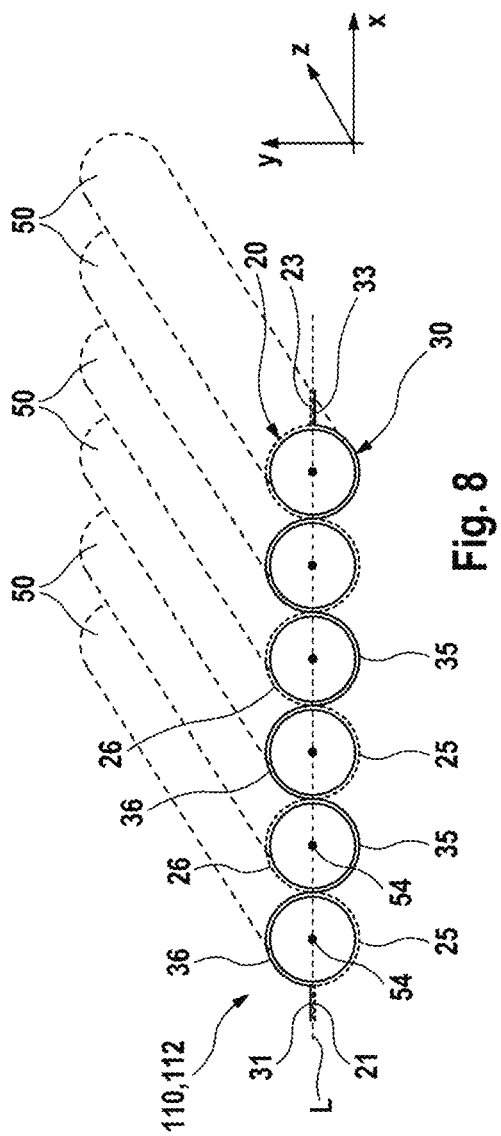
FIG. 8 is a perspective view of a glass article layer according to a second embodiment.

FIG. 8 shows a perspective view of a glass article layer 110 according to a second embodiment. In this embodiment, again, a plurality of glass articles 50 is arranged side by side in the x-direction, and the centers 54 of the glass articles 50 are again arranged along a line L which extends parallel to the x-axis.

Like in FIG. 3, FIG. 8 again shows an exemplary spacer position 112. In this embodiment, two threads 20 and 30 are provided as the spacers at spacer positions 112, thread 20 being shown by a dashed line and thread 30 by a solid line. Each thread 20, 30 is wrapped around every glass article 50, with alternating upper wraps 26, 36 and lower wraps 25, 35. Here, upper wraps 26 of the first thread 20 are combined with lower wraps 35 of the second thread 30 and vice versa in each case. In the region of line L, the upper wraps 26, 36 transition into lower wraps 25, 35, and the lower wraps 25, 35 transition into upper wraps 26, 36. The ends 21 and 31 and the ends 23 and 33 of the threads 20 and 30 may be connected to one another, for example by thermal fusing or by gluing.

Figure 9:
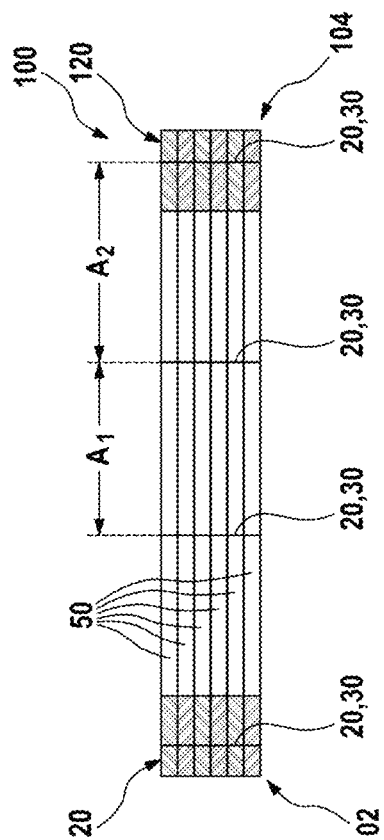
FIG. 9 is a plan view of a glass article bundle.

FIG. 9 shows the plan view of a glass article bundle 100. As has been explained in FIG. 6, four spacer positions 112 are again provided in this glass article layer 110, with intervals $A_1$ to $A_2$. At the ends 102, 104 of the glass article bundle 100, a shrink film 120 is applied.

Figure 10A:
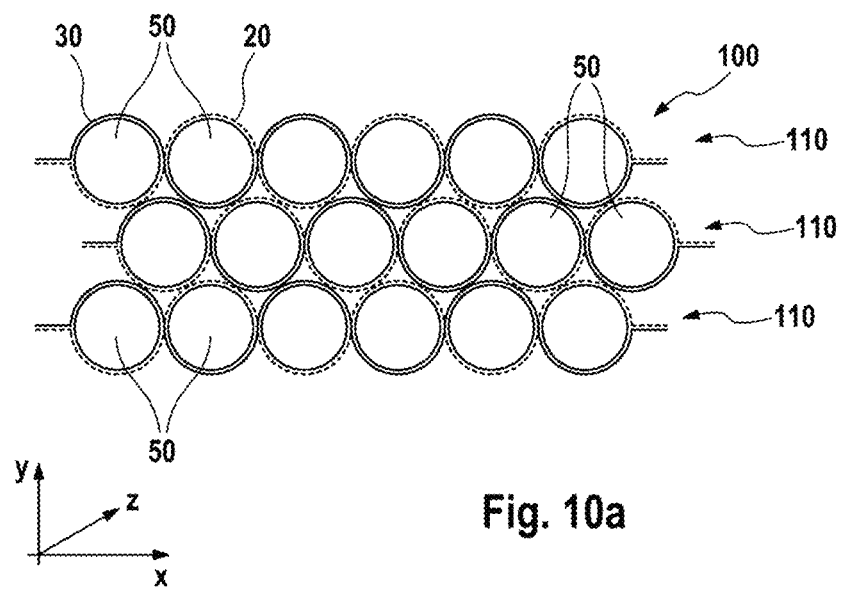
FIG. 10a is a front elevational view showing the end face of a glass article bundle.
Figure 10B:
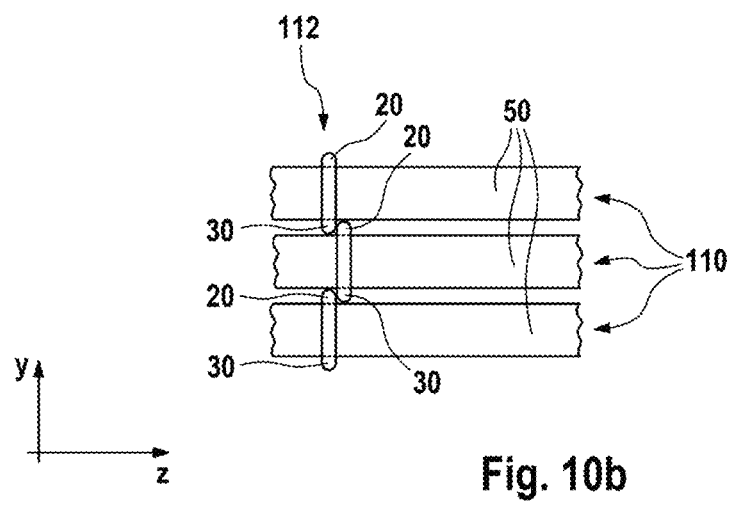
FIG. 10b shows a detail of the glass article bundle of FIG. 10a in the x-direction in a side view.

FIGS. 10a and 10b schematically show a front elevational view and a side view of a glass article bundle 100 comprising three glass article layers 110. Again, in this embodiment, the glass articles 50 are packed in close packing.

FIG. 10b shows a side view of a detail of the glass article bundle of FIG. 10a in the x-direction. The glass article layers 110 are arranged slightly offset relative to each other in the z-direction, so that the threads 20, 30 of the individual glass article layers 110 lie adjacent to each other. This has the advantage that the glass article layers 110 are mutually supported at the spacer positions 112 by two threads 20, 30.

Figure 11:
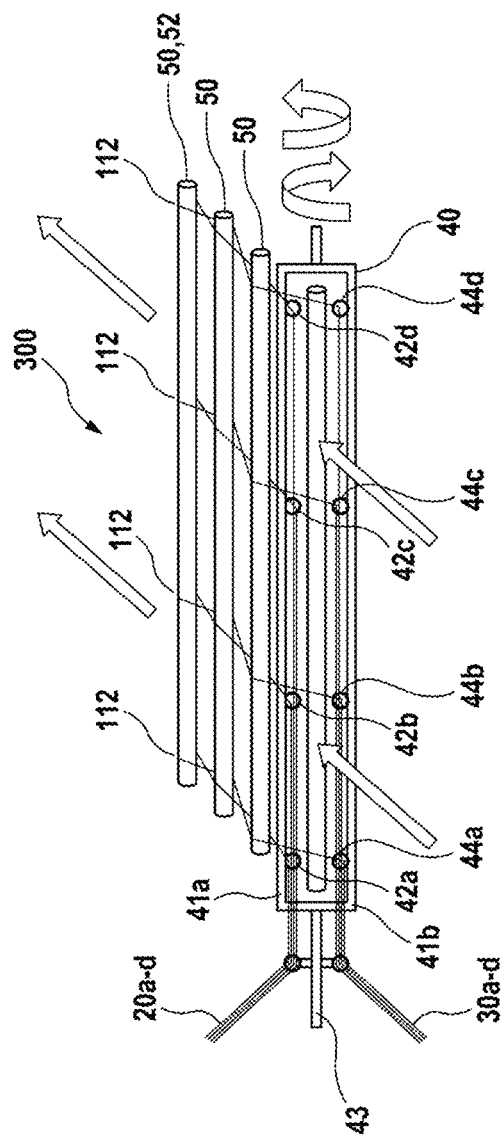
FIG. 11 is a schematic perspective view of a weaving frame of a packing apparatus for explaining the method steps for producing glass article layers according to FIGS. 8 through 10b.
Figure 12:
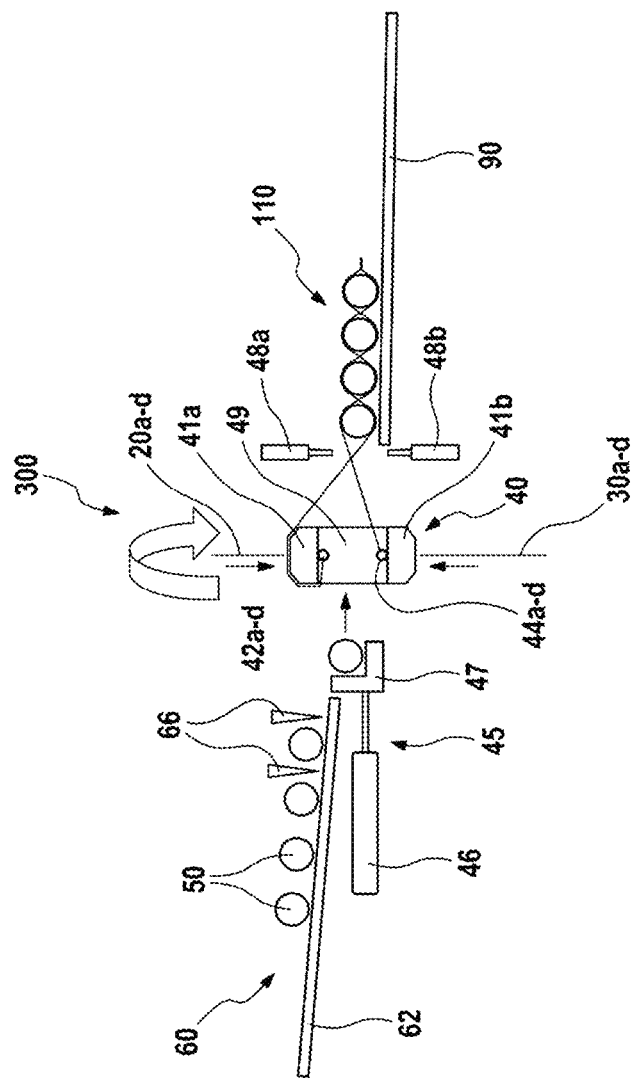
FIG. 12 is a schematic side view of a packing apparatus for explaining the method steps for producing glass article layers according to FIGS. 8 through 10b.

FIGS. 11 and 12 show a packing apparatus 300 for producing a layer 110 of glass articles according to the second embodiment.

According to FIG. 11, this apparatus 300 comprises a weaving frame 40 with weaving beams 41a, 41b, on which thread guiding eyelets 42a-d, 44a-d are arranged at the predetermined spacer positions 112.

The first and second threads 20a-d, 30a-d are supplied to the weaving frame 40 from a lateral side and introduced into the thread guiding eyelets 42a-d, 44a-d.

The weaving frame 40 is mounted for rotation and is driven by a drive shaft 43 so as to perform an alternating forward and reverse rotation, whereby the threads 20a-d, 30a-d are sequentially wrapped around the fed glass articles 50.

FIG. 12 is a side view of this packing apparatus 300 also showing the devices upstream and downstream of the weaving frame 40.

The glass articles 50 are supplied in a feed station 60 which comprises an inclined plane 62 and are separated at the lower end of the inclined plane 62. In the separation station 64 located there, two separating tools 66 are provided, which are introduced from above and between the incoming glass articles 50 to separate them from each other.

After separation, the respective glass article 50 is transferred into the gap 49 between the weaving beams 41a and b of the weaving frame 40 by a pusher 45 which comprises a support 47 for the glass article 50 and an actuating cylinder 46.

The glass article 50 cannot be retained in the weaving frame 40. In the illustrated horizontal arrangement of the feed station 60, the glass article 50 is pushed through the weaving frame 40 by the movable pusher 45.

In a vertical arrangement, which is possible as well, the glass article 50 falls freely through the weaving frame 40. In both cases, the glass article 50 is safely guided by the threads 20a-d, 30a-d which are stretched so as to form a V-shape. The free movement of the glass article 50 is stopped by the stretched intersecting threads before the glass article 50 comes into contact with the preceding glass article 50.

Then, the pusher 45 is retracted and the weaving frame 40 performs a 180° rotation. Subsequently, the next glass article 50 is introduced into the gap 49. The weaving frame 40 then performs a rotation about 180° in the opposite rotation direction. In this way, the individual glass articles 50 are successively wrapped by the two threads 20a-d, 30a-d. Once the glass articles 50 have been wrapped, the glass articles 50 are received by the conveyor device 90.

When the number of glass articles 50 required for a glass article layer 110 has been wrapped by threads 20a-d, 30a-d, the threads 20a-d and the threads 30a-d are fused together and severed at the same time, using a hot stamp 48 consisting of a top part 48a and a bottom part 48b. The so produced glass article layer 110 is removed by a conveyor device 90.

Simultaneously with the fusing and severing of the threads 20a-d, 30a-d, the fusing of threads 20a-d, 30a-d for the start of the producing process of the next glass article layer 110 is achieved.

Figure 13:
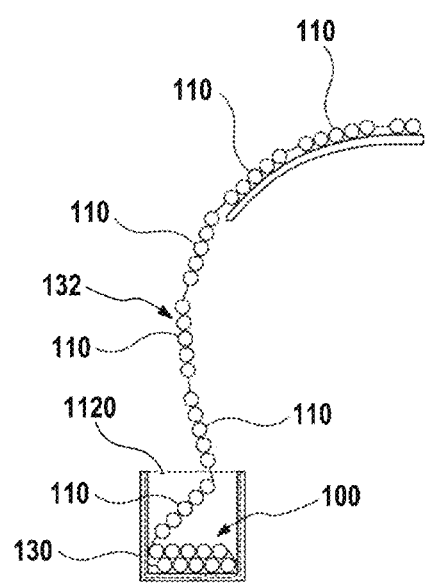
FIG. 13 shows the producing of a glass article bundle from interlinked glass article layers.

FIG. 13 illustrates the producing of a glass article bundle 100. The individual glass article layers 110 are not separated from one another, as has been explained in conjunction with FIGS. 9 and 10. A ribbon 132 of glass article layers 110 is fed into a U-shaped container 130, where the ribbon 132 is folded down such that the individual glass article layers 110 come to rest on top of each other in closest packing. When the container 130 is filled so that a glass article bundle 100 is completed, the ribbon 132 is severed between two glass article layers 110. The glass article bundle 100 is provided with a cover sheath 120 at both ends thereof and then removed from the container 130.

LIST OF REFERENCE NUMERALS

10 Thread, thread-like element
11 First end
12 First connecting section
13 Second end
14 Second connecting section
15 Wrap
16 Loop
17 First loop section
18 Second loop section
19 Third loop section
20 First thread, thread-like element
20a, b, c, d First thread, thread-like element
21 First end
23 Second end
25 Lower wrap
26 Upper wrap
30 Second thread, thread-like element
30a, b, c, d Second thread, thread-like element
31 First end
33 Second end
35 Lower wrap
36 Upper wrap
40 Weaving frame
41a Weaving beam
41b Weaving beam
42a, b, c, d Thread guiding eyelet for first thread
43 Drive shaft
44a, b, c, d Thread guiding eyelet for second thread
45 Pusher
46 Actuating cylinder
47 Support
48 Hot stamp
48a Upper part
48b Lower part
49 Gap
50 Glass article
52 Outer end glass article
54 Center of glass article
60 Glass article feed station
62 First inclined plane
64 Separation station
66 Separating tool
68a, b Thread deflection element
70 Loop station
72 Loop former
74 Push cylinder
76 Layer forming station
78 Second inclined plane
80 Stopper
82 Thread brake
84 Thread cutter
86 Enveloping station
90 Conveyor device
100 Glass article bundle
102 End of glass article bundle
104 End of glass article bundle
110 Glass article layer
112 Spacer position
120 Cover sheath
130 Container
132 Ribbon of glass article layers
200 First packing apparatus
300 Second packing apparatus
$A_1$ Interval of spacer positions
$A_2$ Interval of spacer positions
L Line extending through the centers of the glass articles
S Thread thickness

What is claimed is:

1. A glass article layer comprising:
two glass articles arranged side by side in an x-direction and extending in a z-direction; and
spacers disposed between the two glass articles, the spacers being provided at two spaced-apart spacer positions in the z-direction longitudinally of the two glass articles, wherein the spacers are thread-like elements, and wherein only one thread-like element is provided at each of the two spaced-apart spacer positions without completely encircling an outer circumference of the two glass articles and contacts 40% to 80% of the outer circumference of both of the two glass articles.

2. The glass article layer of claim 1, wherein the thread-like elements are at least partially wrapped around the two glass articles.

3. The glass article layer of claim 1, wherein one thread-like element is provided at each of the two spaced-apart spacer positions.

4. The glass article layer of claim 3, wherein, at each of the two spaced-apart spacer positions, the thread-like element is arranged such that the thread-like element is wrapped around the two glass articles along an equal outer circumferential area thereby forming wraps, and a loop is provided between the two glass articles.

5. The glass article layer of claim 4, wherein the loop extends in a y-direction beyond a line that connects centers of the two glass articles.

6. The glass article layer of claim 4, wherein the loop comprises a first upreaching loop section and a second upreaching loop section which are interconnected by a third loop section.

7. The glass article layer of claim 6, wherein the first and second loop sections are disposed offset to one another in the z-direction.

8. The glass article layer of claim 1, wherein the thread-like element has a first end and a second end, wherein each of the first and second ends is connected to a last wrap through a connecting section.

9. The glass article layer of claim 8, wherein the connecting section rests on an upper side of the glass article layer and extends in the x-direction over the glass article layer.

10. The glass article layer of claim 1, wherein the thread-like elements comprise a first thread-like element and a second thread-like element at each of the two spaced-apart spacer positions.

11. The glass article layer of claim 10, wherein the first and second thread-like elements are wrapped around the two glass articles alternately along an upper side and a lower side thereof.

12. The glass article layer of claim 10, wherein the two glass articles are wrapped by the first thread-like element along an upper side thereof, thereby defining upper wraps, and by the second thread-like element along a lower side thereof, thereby defining lower wraps, and alternately thereto are wrapped by the first thread-like element along the lower side thereof, thereby defining lower wraps, and by the second thread-like element along the upper side thereof, thereby defining upper wraps.

13. The glass article layer of claim 12, wherein each thread-like element has a first end and a second end, wherein the first ends are connected to one another and the second ends are connected to one another.

14. The glass article layer of claim 13, wherein the ends are connected to one another by thermal fusing, gluing, or by mechanical connection.

15. The glass article layer of claim 1, wherein the thread-like element has a thread thickness S, with $0.25 \text{ mm} \leq S \leq 2.5 \text{ mm}$.

16. The glass article layer of claim 1, wherein the thread-like element is made of a plastic material selected from a group consisting of polypropylene (PP), polyethylene (PE), high-density polyethylene (HDPE), polyethylene wax, polyamide (PA), styrene-acrylonitrile copolymer (SAN), polyester, polyethylene terephthalate (PET), polybutylene terephthalate (PBT), polyurethane (PU), acrylonitrile-butadiene-styrene copolymer (ABS), polyether ether ketone (PEEK), and polycarbonate (PC).

17. The glass article layer of claim 1, wherein the two glass articles are glass tubes and/or glass rods.

18. The glass article layer of claim 1, wherein the two spaced-apart spacer positions are arranged at intervals $A_1$, $A_2$ with values between 20 cm and 80 cm.

19. A glass article bundle, comprising at least two glass article layers of claim 1, which are arranged on top of each other in a y-direction, wherein the glass article layers are disposed such that the glass articles are arranged in close packing.

20. The glass article bundle of claim 19, further comprising a cover sheath at least at the ends thereof.

21. The glass article bundle of claim 20, wherein the cover sheath is a shrink film.

22. A glass article layer comprising:
two glass articles arranged side by side in an x-direction and extending in a z-direction; and
spacers disposed between the two glass articles, the spacers being provided at two spaced-apart spacer positions in the z-direction longitudinally of the two glass articles, wherein the spacers are thread-like elements, and wherein at least one of the thread-like elements is provided at each of the two spaced-apart spacer positions, wherein one thread-like element is provided at each of the two spaced-apart spacer positions, and wherein, at each of the two spaced-apart spacer positions, the thread-like element is arranged such that the thread-like element is wrapped around the two glass articles along an equal outer circumferential area thereby forming wraps, and a loop is provided between the two glass articles.

23. A glass article layer comprising:
two glass articles arranged side by side in an x-direction and extending in a z-direction; and
spacers disposed between the two glass articles, the spacers being provided at two spaced-apart spacer positions in the z-direction longitudinally of the two glass articles, wherein the spacers are thread-like elements, and wherein one thread-like element is provided at each of the two spaced-apart spacer positions, and wherein each of the thread-like elements has a first end and a second end, wherein each of the first and second ends is connected to a last wrap through a connecting section.

24. A glass article layer comprising:
two glass articles arranged side by side in an x-direction and extending in a z-direction;
a first thread-like element at a first position in the z-direction, the first thread-like element is a first continuous element that is positioned between the two glass articles at the first position without completely encircling an outer circumference of the two glass articles; and
a second thread-like element at a second position in the z-direction, the second position being spaced in the z-direction from the first position, the second thread-like element is a second continuous element that is positioned between the two glass articles at the second position without completely encircling the outer circumference of the two glass articles,
wherein the first and second thread-like elements contact 40% to 80% of the outer circumference of each of the two glass articles; and
wherein the first thread-like element is an only thread-like element at the first position and the second thread-like element is an only thread-like element at the second position.

25. The glass article layer of claim 24, wherein the first thread-like element extends between the two glass articles in the z-direction.

26. The glass article layer of claim 24, wherein the two glass articles have at least a portion of the outer circumference free from any thread-like element.

27. The glass article layer of claim 24, wherein the first thread-like element has two portions positioned between the two glass articles at the first position.

\* \* \* \* \*